(12) United States Patent
Kang et al.

(10) Patent No.: US 8,923,798 B2
(45) Date of Patent: Dec. 30, 2014

(54) APPARATUS AND METHOD OF PROCESSING RESCUE REQUEST SIGNAL

(75) Inventors: Yong-Hoon Kang, Seoul (KR);
Sang-Jun Kim, Gyeonggi-do (KR);
Pil-Kyu Jin, Gyeonggi-do (KR)

(73) Assignee: R-Tron Inc., Seoul (KR)

(*) Notice: Subject to any disclaimer, the term of this patent is extended or adjusted under 35 U.S.C. 154(b) by 915 days.

(21) Appl. No.: 12/588,943

(22) Filed: Nov. 3, 2009

(65) Prior Publication Data

US 2011/0026452 A1 Feb. 3, 2011

(30) Foreign Application Priority Data

Jul. 31, 2009 (KR) .................. 10-2009-0070405

(51) Int. Cl.
| | | |
|---|---|---|
| H04M 11/04 | (2006.01) |
| H04B 3/36 | (2006.01) |
| H04B 1/60 | (2006.01) |
| H04W 4/22 | (2009.01) |
| H04B 7/155 | (2006.01) |
| H04W 76/00 | (2009.01) |
| H04B 7/14 | (2006.01) |
| H04B 17/02 | (2006.01) |
| H04B 7/15 | (2006.01) |
| H04B 7/185 | (2006.01) |
| H04W 64/00 | (2009.01) |

(52) U.S. Cl.
CPC ............. *H04W 4/22* (2013.01); *H04B 7/155* (2013.01); *H04W 76/007* (2013.01); *H04W 64/00* (2013.01)
USPC ............. 455/404.1; 455/404.2; 455/7; 455/9; 455/16; 455/11.1; 455/13.1; 379/45; 370/315; 370/392

(58) Field of Classification Search
CPC ............ H04M 2242/04; H04M 2242/30; G08B 25/009; G08B 25/01; G08B 25/016; G08B 25/10; H04B 7/14; H04B 7/145; H04B 7/15; H04W 76/007; H04W 84/047

USPC ............ 455/404.1, 404.2, 456.1, 456.2, 7–25; 370/315–327; 342/126–127, 357.55
See application file for complete search history.

(56) References Cited

U.S. PATENT DOCUMENTS

| | | | |
|---|---|---|---|
| 2003/0220075 A1* | 11/2003 | Baker et al. | 455/17 |
| 2003/0236067 A1* | 12/2003 | Hasarchi et al. | 455/10 |

(Continued)

FOREIGN PATENT DOCUMENTS

| | | | |
|---|---|---|---|
| JP | 2007295133 A | * | 11/2007 |
| KR | 2008-0047022 | * | 5/2008 |

(Continued)

OTHER PUBLICATIONS

English Translation of KR 2008-0047022 (Published May 2008) Inventor: Jun-Bae Ahn.*

(Continued)

*Primary Examiner* — Dwayne Bost
*Assistant Examiner* — Nalini Mummalaneni
(74) *Attorney, Agent, or Firm* — Bacon & Thomas, PLLC (57) ABSTRACT

Provided is a rescue request signal processing device connected with a repeater and including a signal detector configured to detect identification information of a wireless communication terminal from an uplink signal outputted from the wireless communication terminal; a signal strength information generator configured to generate strength information of the uplink signal of the wireless communication terminal when the detected identification information of the wireless communication terminal is identical with identification information of a wireless communication terminal included in a request signal for location information transmitted from a location information requesting device; and a transmitter configured to transmit the strength information of the uplink signal and at least one of location information and identification information of the repeater to a location information server.

4 Claims, 7 Drawing Sheets

(56) References Cited

U.S. PATENT DOCUMENTS

2004/0203429 A1\* 10/2004 Anderson et al. .......... 455/67.11
2006/0009191 A1\* 1/2006 Malone, III ................ 455/404.1

FOREIGN PATENT DOCUMENTS

WO    WO 2004105273 A1 \* 12/2004
WO    WO 2008010756 A1 \* 1/2008

OTHER PUBLICATIONS

3rd Generation Partnership Project; Technical Specification Group Services and System Aspects; Functional stage 2 description of Location Services (LCS) (Release 9) Published: Jun. 2009.\*
WiBRO trademark information; Published Dec. 2008.\*
WiMAX trademark information; Published Sep. 2009.\*

\* cited by examiner

FIG. 6A

APPARATUS AND METHOD OF PROCESSING RESCUE REQUEST SIGNAL

FIELD OF THE INVENTION

The present disclosure relates to an apparatus and a method of processing a rescue request signal outputted from a wireless communication terminal.

BACKGROUND OF THE INVENTION

As wireless communication techniques have been developed, wireless communication terminals including cellular phones have been widely available to the general public. Further, as performances of the wireless communication terminals have been developed, various services including communication services such as voice communication or data communication and application services thereof are provided. In particular, an emergency rescue service has been provided by using attributes of the wireless communication terminals such as portability and a possibility of being tracked.

An emergency rescue request using the wireless communication terminal has been available by the following two methods. A first method is to directly send location information to a location information server by using a GPS module installed in a wireless communication terminal. A second method is that a wireless communication terminal transmits location information of base stations to a location information server in the form of phase information) and the location information server then checks location information of the wireless communication terminal by a triangulation method.

In case of using the first method, if the GPS module is not installed in the wireless communication terminal or the wireless communication terminal is located in a closed space where a GPS signal can not reach, it is difficult to perform location tracking.

In case of using the second method, a signal delay or a change in call strength may be incurred due to a repeater positioned between the wireless communication terminal and the base station, so that an error may occur in checking the location information.

BRIEF SUMMARY OF THE INVENTION

An embodiment of the present invention provides a rescue request signal processing apparatus and a digital repeater configured to obtain location information based on a rescue request signal included in a signal outputted from a wireless communication terminal.

Another embodiment of the present invention provides a rescue request signal processing method and a location information providing method using the rescue request signal processing apparatus.

In accordance with a first aspect of the present disclosure, there is provided a rescue request signal processing device connected with a repeater, the device including: a signal detector configured to detect identification information of a wireless communication terminal from an uplink signal outputted from the wireless communication terminal; a signal strength information generator configured to generate strength information of the uplink signal of the wireless communication terminal when the detected identification information of the wireless communication terminal is identical with identification information of a wireless communication terminal included in a request signal for location information transmitted from a location information requesting device; and a transmitter configured to transmit the strength information of the uplink signal and at least one of location information and identification information of the repeater to a location information server.

In accordance with a second aspect of the present disclosure, there is provided a digital repeater including: one or more digital receivers configured to receive an uplink signal outputted from a wireless communication terminal; a signal processing unit configured to amplify a signal received from the digital receiver and multiplex signals received from the one or more digital receivers; a D/A converter configured to convert a signal received from the signal processing unit into an RF signal and transmit the converted RF signal to an RF unit; a signal detector configured to detect identification information of the wireless communication terminal from the signal received from the digital receiver; a signal strength information generator configured to generate strength information of the uplink signal outputted from the wireless communication terminal when the detected identification information of the wireless communication terminal is identical with identification information of a wireless communication terminal included in a request for location information transmitted from a location information requesting device; and a transmitter configured to transmit the strength information of the uplink signal and at least one of location information and identification information of the repeater to a location information server.

In accordance with a third aspect of the present disclosure, there is provided a location information providing method including: receiving a request for location information from a location information requesting device in response to a rescue request signal outputted from a wireless communication terminal; checking location information of a base station, through which a signal of the wireless communication terminal passes, based on identification information of the wireless communication terminal included in the received request for location information; transmitting the identification information of the wireless communication terminal to a rescue request signal processing apparatus connected with a repeater linked to the checked base station; receiving strength information of an uplink signal of a wireless communication terminal including identification information identical with the identification information of the wireless communication terminal and information of the repeater from the rescue request signal processing apparatus, the repeater being connected with the rescue request signal processing apparatus; generating location information of the wireless communication terminal based on the strength information of the uplink signal and the information of the repeater; and transmitting the generated location information to the location information requesting device.

In accordance with a fourth aspect of the present disclosure, there is provided a rescue request signal processing method including: receiving identification information of a wireless communication terminal from a location information server; detecting the identification information of the wireless communication terminal included in an uplink signal by a rescue request signal processing apparatus connected with a repeater; generating strength information of the uplink signal when the detected identification information of the wireless communication terminal is identical with the identification information of the wireless communication terminal received from the location information server; and transmitting the generated strength information of the uplink signal and information of the repeater to the location information server.

In view of the foregoing, a location of a wireless communication terminal can be tracked based on a rescue request signal outputted from the wireless communication terminal. In particular, before the signal outputted from the wireless communication terminal is amplified by a repeater, the rescue request signal can be detected and strength information of the rescue request signal can be generated, so that it is possible to prevent a signal delay or a change in the strength information caused by the repeater. Thus, more accurate location information can be generated. With accuracy of the location information, rescue activities using an emergency rescue system can be carried out more quickly and accurately.

BRIEF DESCRIPTION OF THE DRAWINGS

The disclosure may best be understood by reference to the following description taken in conjunction with the following figures.

DETAILED DESCRIPTION OF THE INVENTION

Hereinafter, embodiments of the present invention will be described in detail with reference to the accompanying drawings so that the present invention may be readily implemented by those skilled in the art. However, it is to be noted that the present invention is not limited to the embodiments but can be implemented in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

Figure 1:
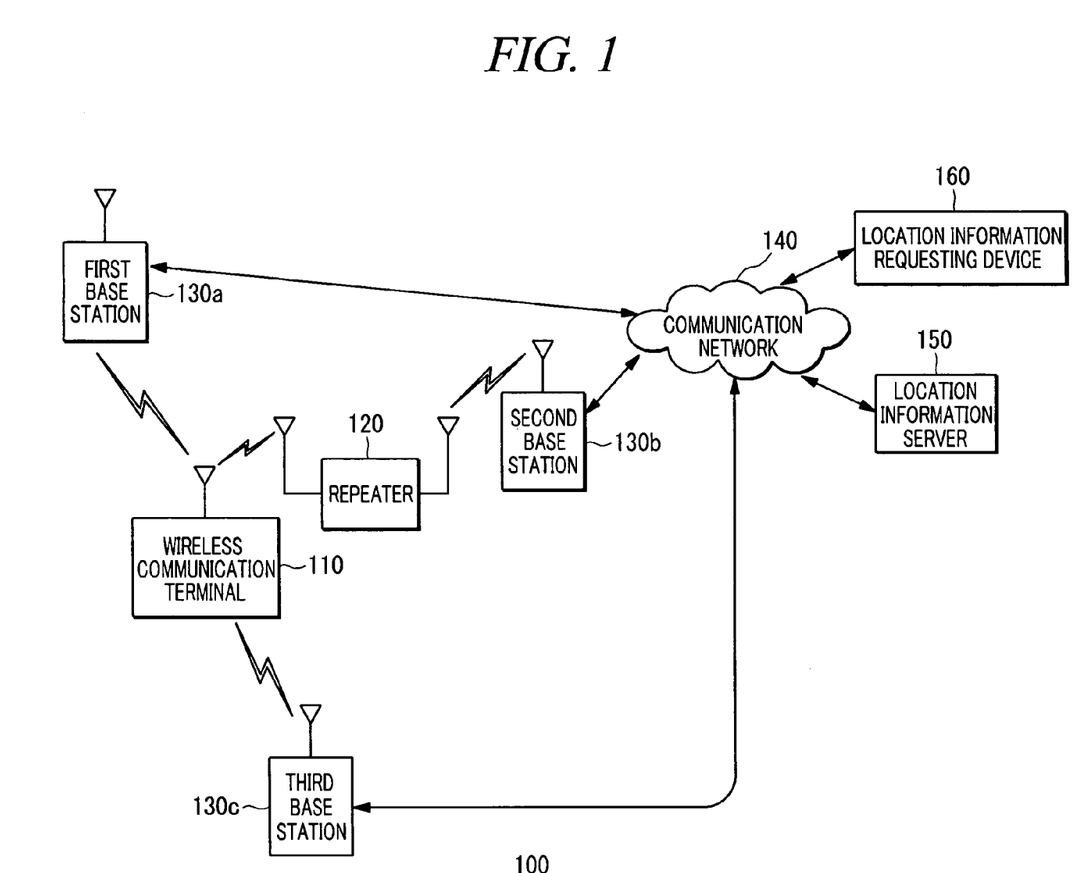
FIG. 1 is a view illustrating a general emergency rescue system using a wireless communication system.

FIG. 1 is a view illustrating a general emergency rescue system using a wireless communication system.

An emergency rescue system 100 includes a wireless communication terminal 110, a repeater 120, first to third base stations 130a, 130b and 130c, a communication network 140, a location information server 150 and a location information requesting device 160.

In case of an emergency situation, the wireless communication terminal 110 outputs a rescue request signal E911. The rescue request signal E911 is transmitted to the location information requesting device 160 via the base stations 130a to 130c. The location information requesting device 160 receiving the rescue request signal E911 requests location information from the location information server 150 connected with a relevant communication network. The location information server 150 receiving the request of the location information from the location information requesting device 160 transmits recently updated location information of the wireless communication terminal 110 to the location information requesting device 160. The location information requesting device 160 receiving the location information from the location information server 150 carries out rescue activities such as a rescue of a user of the wireless communication terminal 110.

In the emergency rescue system configured as stated above, if the wireless communication terminal 110 does not include a GPS module, a location of the wireless communication terminal 110 is tracked by using a triangulation method among the base stations 130a to 130c and the wireless communication terminal 110. However, there is a possibility that a signal delay or a change in call strength may be incurred due to a repeater positioned between the wireless communication terminal 110 and the base stations 130a to 130c. Such a change may cause an error in location information of the wireless communication terminal 110 calculated by the location information server 150.

Figure 2:
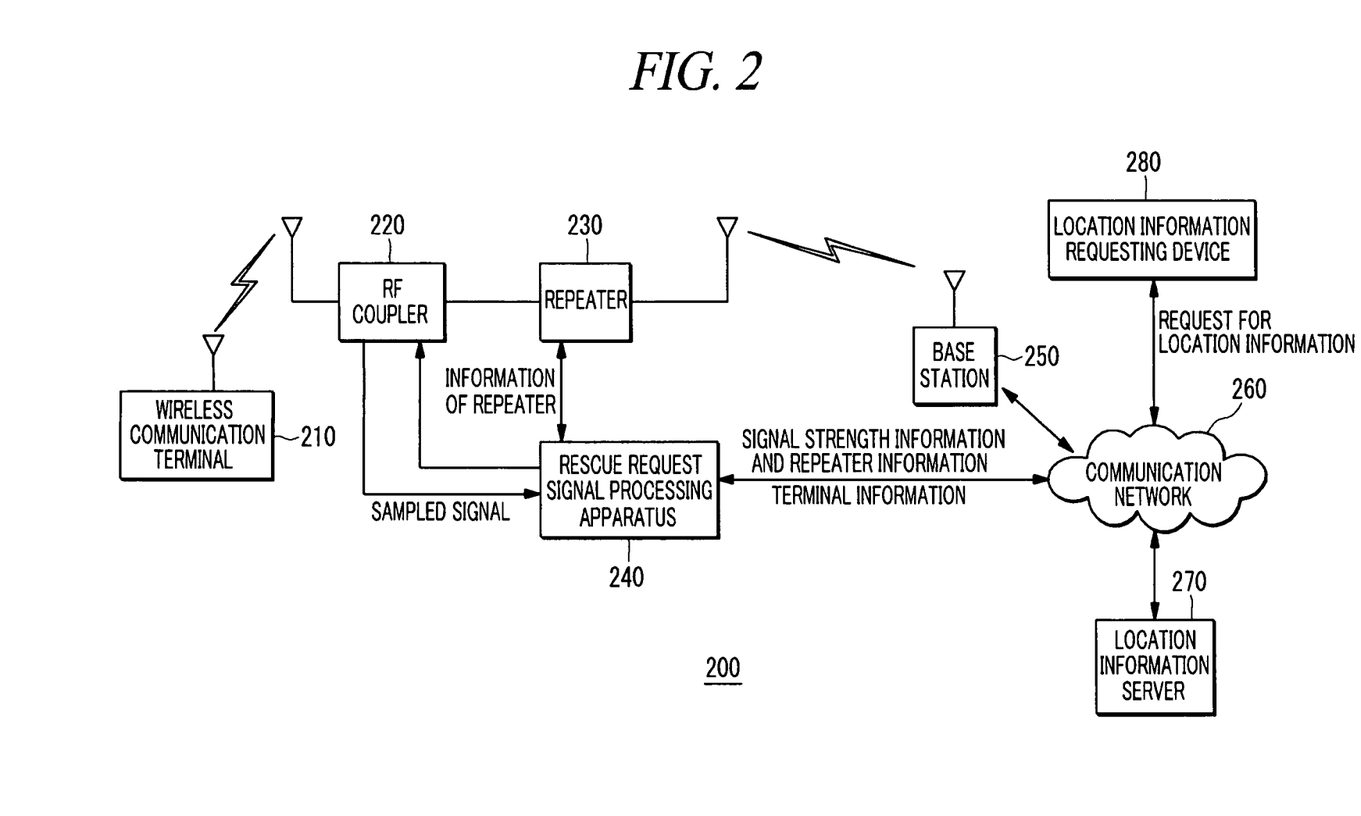
FIG. 2 is a view showing an emergency rescue system in accordance with an embodiment of the present invention.

FIG. 2 is a view showing an emergency rescue system in accordance with an embodiment of the present invention.

An emergency rescue system 200 includes a wireless communication terminal 210, an RF coupler 220, a repeater 230, a rescue request signal processing apparatus 240, a base station 250, a communication network 260, a location information server 270 and a location information requesting device 280.

The wireless communication terminal 210 outputs a rescue request signal E911 when rescue request conditions are satisfied. In this case, the rescue request signal E911 can be transmitted to the base station 250 via the repeater 230. When a user presses a rescue request key equipped in the wireless communication terminal 250, the rescue request conditions can be satisfied. Or, when there is no touch of the key for a predetermined time, the rescue request conditions can also be satisfied. In addition to these cases, a situation in need of a rescue request can be conditioned so as to be recognized by the wireless communication terminal 210.

The rescue request signal E911 can be outputted continually for a preset time. Otherwise, the rescue request signal E911 can be outputted repeatedly at a preset period.

The rescue request signal E911 to be transmitted may include identification information of the wireless communication terminal 210. Further, if the GPS module is installed in the wireless communication terminal 210, the rescue request signal E911 to be transmitted may include location information generated by the GPS module.

The rescue request signal E911 is different from a general signal in view of call strength. Further, the rescue request signal E911 can be set to be within a preset frame of a whole frame of an uplink signal. Furthermore, the rescue request signal E911 can be transmitted via a preset channel in the uplink signal.

The wireless communication terminal 210 is a wireless communication device having portability and mobility and may include all kinds of handheld wireless communication devices such as a PCS (Personal Communication System), a GSM (Global System for Mobile communications), a PDC (Personal Digital Cellular), a PHS (Personal Handyphone System), a PDA (Personal Digital Assistant), an IMT (International Mobile Telecommunication)-2000, a CDMA (Code Division Multiple Access)-2000, a W-CDMA (W-Code Division Multiple Access), a WiBro® (Wireless Broadband Internet), a WiMAX® (Worldwide Interoperability for Microwave Access), and the like.

The RF coupler 220 receives an uplink signal outputted from the wireless communication terminal 210 via an antenna and transmits it to the repeater 230. Further, the RF coupler 220 samples the uplink signal and transmits the sampled uplink signal to the rescue request signal processing apparatus 240.

The repeater 230 amplifies the uplink signal received from the RF coupler 220 and transmits the amplified uplink signal to the base station 250. Meanwhile, as illustrated in FIG. 2, the rescue request signal processing apparatus 240 is connected with the repeater 230. Further, the rescue request signal processing apparatus 240 may be also embedded in the repeater 230.

The base station 250 receives the amplified uplink signal from the repeater 230 and transmits it to the communication network 260. In this case, if the uplink signal includes the rescue request signal E911, it is transmitted to the location information requesting device 280 via the communication network 260. Even though it is possible to obtain location information of the wireless communication terminal 210 based on the rescue request signal E911 received by the base station 250, there is a problem that errors in location information can be made due to a signal delay or a change in call strength caused by a repeater, as described in the conventional art.

If the location information requesting device 280 receives the rescue request signal E911 from the wireless communication terminal 210 via the communication network 260, it requests location information of the wireless communication terminal 210 from the location information server 270. The request for location information may include identification information of the wireless communication terminal 210 contained in the rescue request signal E911. If the location information of the wireless communication terminal 210 is obtained according to the request for location information, emergency rescue activities can be carried out based on the obtained location information. The location information requesting device 280 can be provided in emergency rescue institutions such as a hospital, a police station or a fire station.

If the location information server 270 receives the request for location information from the location information requesting device 280, it identifies location information of a base station, through which a signal of the wireless communication terminal passes, based on identification information of the wireless communication terminal included in the request for location information. Further, the identification information of the wireless communication terminal is transmitted to the rescue request signal processing apparatus 240 connected with the repeater linked to a lower level of the identified base station. The rescue request signal processing apparatus 240 compares the identification information of the wireless communication terminal received from the location information server 270 with the identification information of the wireless communication terminal included in the uplink signal received by itself. And the rescue request signal processing apparatus 240 transmits strength information of the uplink signal and information of the repeater in case that both identification information is identical with each other. This configuration will be explained in detail later.

The location information server 270 calculates location information of the wireless communication terminal 210 based on the strength information of the uplink signal and the identification information or location information of the repeater, which are transmitted from the rescue request signal processing apparatus 240. The number of the repeaters which transmit the unlink signal of the wireless communication terminal outputting the rescue request signal E911 can be one or more. Therefore, a repeater having the greatest uplink signal strength is determined as a repeater closest to the wireless communication terminal 210 outputting the rescue request signal E911.

The calculated location information of the wireless communication terminal 210 is transmitted to the location information requesting device 280 according to the request of the location information requesting device 280. Alternatively, the location information of the wireless communication terminal 210 can be automatically transmitted to the location information requesting device 280. That is, when the rescue request signal is received by the location information server 270, the location information server 270 calculates location information of the wireless communication terminal 210 based on the received rescue request signal and transmits the calculated location information and identification information of the wireless communication terminal 210 to the location information requesting device 280 to carry out rescue activities.

In this case, the location information server 270 can pre-store the repeater's location information corresponding to the identification information of the repeater. Therefore, the identification information of the repeater alone makes it possible to identify the location information of the repeater.

The rescue request signal processing apparatus 240 receives the identification information of the wireless communication terminal included in the request of the location information requesting device 280 for the location information from the location information server 270, and detects identification information identical with the received identification information of the wireless communication terminal from the uplink signal. To be specific, the rescue request signal processing apparatus 240 detects identification information of the wireless communication terminal from the uplink signal sampled and transmitted by the RF coupler 220.

Subsequently, the rescue request signal processing apparatus 240 compares the detected identification information of the wireless communication terminal with the identification information of the wireless communication terminal received from the location information server 270 and generates strength information of an uplink signal in case that both identification information is identical with each other. The strength information of the uplink signal is used to identify the location information of the repeater. If the wireless communication terminal 210 outputs the rescue request signal E911, the rescue request signal is transmitted to a plurality of repeaters including a repeater closest to the wireless communication terminal 210. At this time, the strength of the uplink signal transmitted to a repeater most adjacent to the wireless communication terminal 210 is greatest, so that it is possible to search the repeater closest to the wireless communication terminal 210 based on the strength information of the uplink signal.

Thereafter, the rescue request signal processing apparatus 240 receives information of the repeater 230, i.e., identification information or location information of the repeater, from the repeater and transmits the location information to the location information server 270 via the communication network 260. The identification information or location information of the repeater relates to the repeater 230 connected with the rescue request signal processing apparatus 240. Alternatively, the rescue request signal processing apparatus 240 may receive and pre-store the identification information or location information of the repeater and then transmit it to the location information server 270.

In this way, the rescue request signal processing apparatus 240 detects the identification information of the wireless communication terminal based on the uplink signal which is not yet inputted into the repeater 230 and transmits the identification information or location information of the repeater and the strength information of the uplink signal directly to the location information server 270, so that it is possible to minimize a signal delay or a change in call strength caused by the repeater. A detailed configuration of the rescue request signal processing apparatus 240 will be explained later.

The communication network 260 can be implemented by a wired network such as a public switched telephone network (PSTN), Ethernet, a mobile SMS server, a local area network (LAN), a wide area network (WAN) or a value added network (VAN) or all kinds of wireless networks such as a mobile radio communication network, a satellite communication network, a wireless LAN, a radio access network (RAN) or the like. Here, in case of using the mobile SMS server, the strength information of the uplink signal and the identification information or location information of the repeater can be transmitted by installing a SMS terminal in the rescue request signal processing apparatus 240 or by using a SMS terminal installed in the repeater 230. That is, if the SMS terminal is additionally installed in the rescue request signal processing apparatus 240, the strength information of the uplink signal and the identification information or location information of the repeater can be transmitted to the location information server 270 through the RF coupler 220. Further, if the SMS terminal is included in the repeater 230, the strength information of the uplink signal and the identification information or location information of the repeater can be transmitted to the location information server 270 by directly linking to a network management system (NMS) installed in the repeater.

Hereafter, the detailed configuration of the rescue request signal processing apparatus 240 will be explained.

Figure 3:
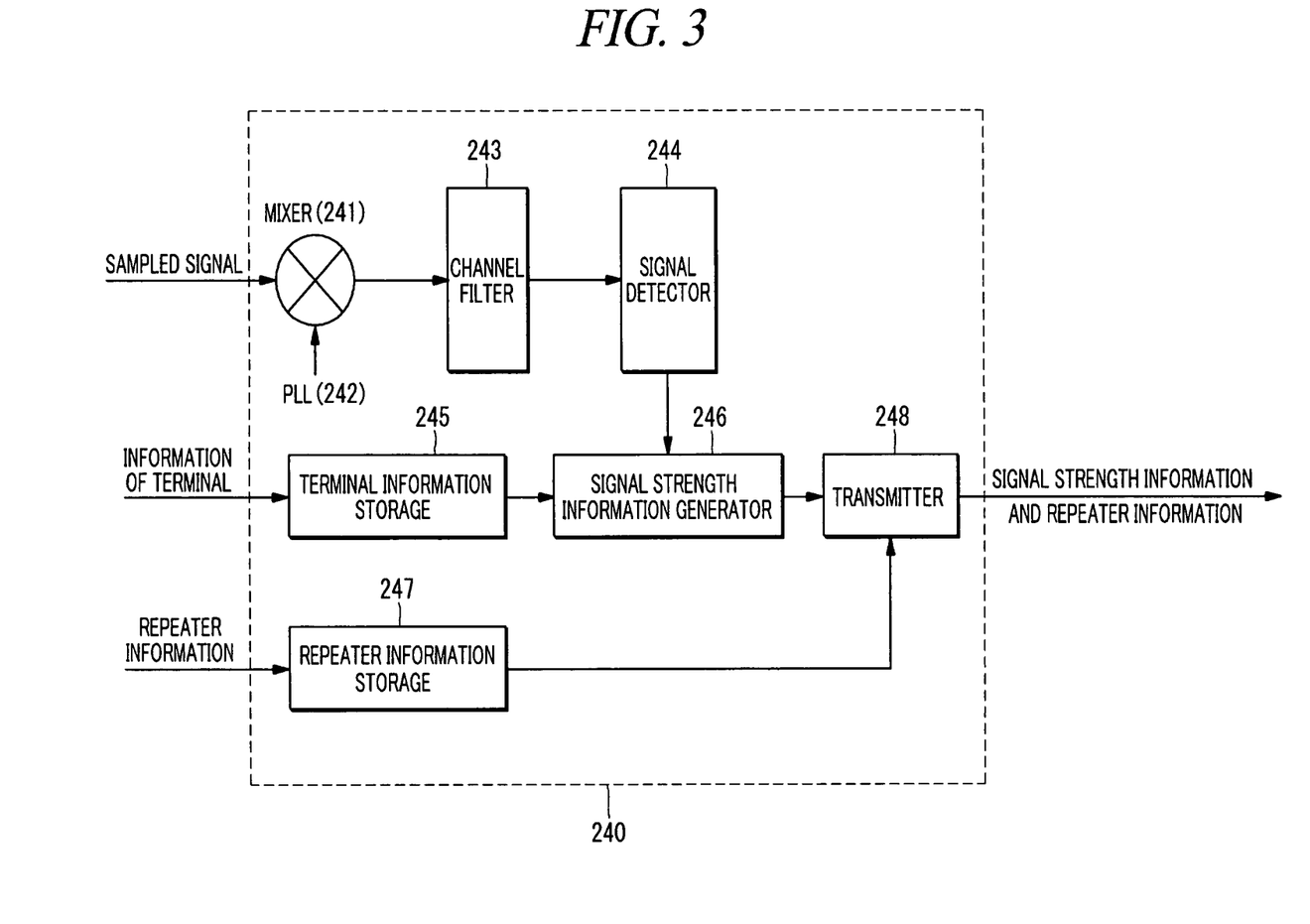
FIG. 3 is a view illustrating a detailed configuration of a rescue request signal processing apparatus in accordance with an embodiment of the present invention.

FIG. 3 is a view illustrating a detailed configuration of a rescue request signal processing apparatus in accordance with an embodiment of the present invention.

The rescue request signal processing apparatus 240 includes a mixer 241, a phase locked loop (PLL) 242, a channel filter 243, a signal detector 244, a terminal information storage 245, a signal strength information generator 246, a repeater information storage 247 and a transmitter 248.

As a reference, each of components illustrated in FIG. 3 in accordance with the embodiment of the present invention may imply software or hardware such as a field programmable gate array (FPGA) and an application specific integrated circuit (ASIC), and they carry out a predetermined function.

However, the components are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables or the like.

The components and functions thereof can be combined with each other or can be divided.

The mixer 241 receives a sampled signal from the RF coupler 220 and converts a frequency such that the received signal can be converted into a digital signal. In this case, the frequency of the received signal is converted based on a frequency determined by the PLL 242. In particular, by converting the frequency of the PLL 242 according to a usable frequency of the repeater 230 connected with the rescue request signal processing apparatus 240, a channel suitable for the repeater can be selected.

The channel filter 243 filters the signals outputted from the mixer 241 and obtains a signal of predetermined channel.

The signal detector 244 detects a predetermined signal or a received signal on a predetermined channel among the filtered signals as identification information of the wireless communication terminal. In this wireless communication system, if a plurality of different frequencies are used, the mixer 241 or the signal detector 244 converts the frequencies such that a channel of only a predetermined frequency is selected.

The terminal information storage 245 receives the identification information of the wireless communication terminal 210 from the location information server 270 and stores it therein. As described above, the rescue request signal E911 includes the identification information of the wireless communication terminal 210 outputting the rescue request signal E911 and the identification information of the wireless communication terminal 210 is transmitted to the rescue request signal processing apparatus 240 via the location information requesting device 280 and the location information server 270. The transmitted identification information of the wireless communication terminal 210 is stored in the terminal information storage 245. In this case, identification information of one or more wireless communication terminals 210 can also be stored in the terminal information storage 245.

The signal strength information generator 246 generates strength information of an uplink signal outputted from the wireless communication terminal when the identification information of the wireless communication terminal detected by the signal detector 244 is identical with the identification information of the wireless communication terminal stored in the terminal information storage 245. In this case, the strength information of the uplink signal is linked with the identification information of the wireless communication terminal 210. The identification information of the wireless communication terminals stored in the terminal information storage 245 is received from the location information server 270 and these wireless communication terminals outputted the rescue request signals E911. Accordingly, the signal strength information generator 246 checks which of the wireless communication terminals outputted a rescue request signal E911 by comparing identification information of the wireless communication terminals with each other. With this configuration, the signal strength information generator 246 generates uplink signal strength information of only the wireless communication terminal outputting the rescue request signal E911. If the terminal information storage 245 stores therein a plurality of identification information, the identification information of the wireless communication terminal detected by the signal detector 244 is compared with each of the plurality of identification information stored in the terminal information storage 245.

The transmitter 248 transmits the strength information of the uplink signal and the location information or identification information of the repeater 230 to the location information server 270.

Figure 4:
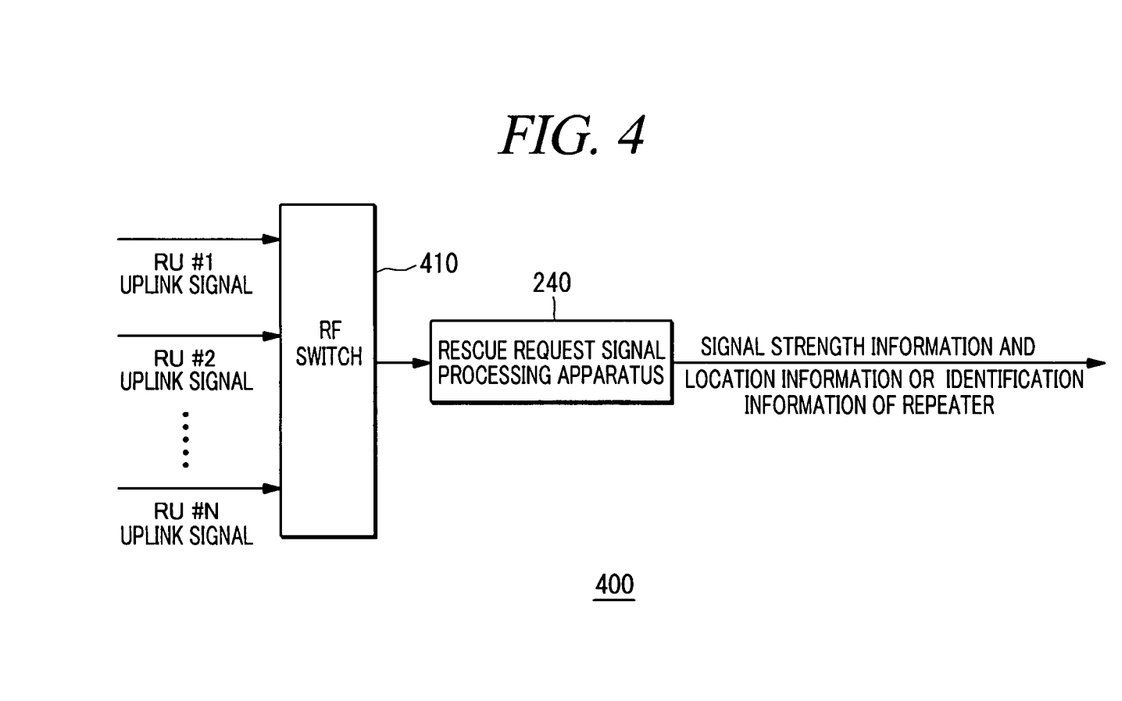
FIG. 4 is a view showing a repeater in accordance with another embodiment of the present invention.

FIG. 4 is a view showing a repeater in accordance with another embodiment of the present invention.

A master repeater 400 illustrated in FIG. 4 is a distribution repeater such as an RF distribution repeater or an optical distribution repeater and a rescue request signal processing apparatus 240 is embedded therein.

The master repeater 400 includes an RF switch 410 that switches uplink signals transmitted from numerous remote repeaters (not illustrated) and the rescue request signal processing apparatus 240 that detects identification information of the wireless communication terminal from the uplink signals transmitted via the RF switch 410 and generates strength information of the uplink signals.

Unlike the configuration as illustrated in FIG. 2, the master repeater 400 processes the signals transmitted from the numerous remote repeaters, so that costs can be reduced. Here, the rescue request signal processing apparatus 240 includes location information or identification information of each remote repeater.

Figure 5:
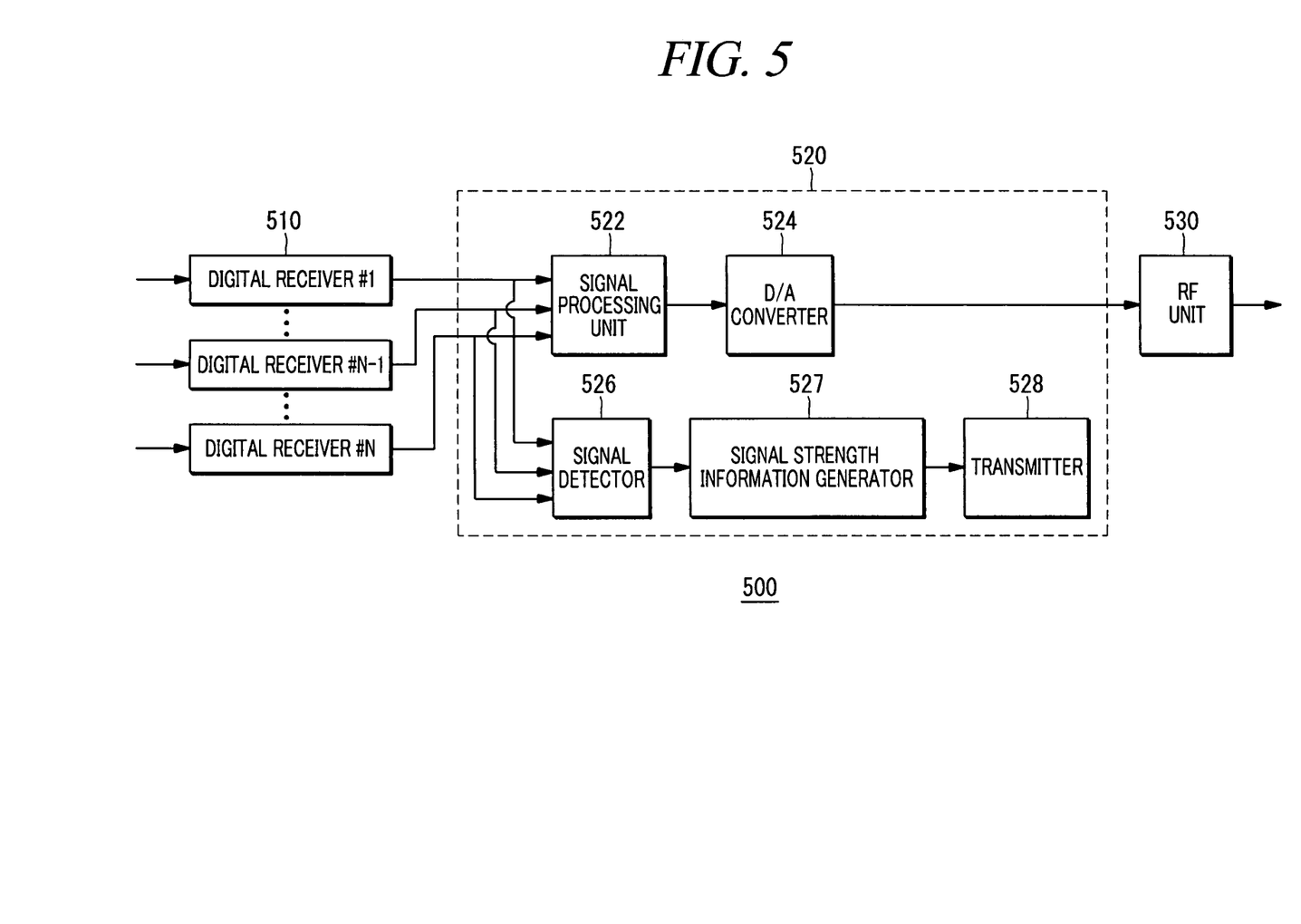
FIG. 5 is a view showing a repeater in accordance with still another embodiment of the present invention.

FIG. 5 is a view showing a repeater in accordance with still another embodiment of the present invention.

A repeater 500 illustrated in FIG. 5 has the same configuration as that of a digital repeater or a digital distribution repeater and includes a signal detector 526 that detects identification information of a wireless communication terminal from uplink signals.

The repeater 500 includes a digital receiver 510, a digital signal processing unit 520 and an RF unit 530.

The digital receiver 510 receives a terminal signal which is converted into a digital signal by numerous remote repeaters (not illustrated) and transmits it to the digital signal processing unit 520.

The digital signal processing unit 520 amplifies the signal received from the digital receiver 510; detects an emergency rescue signal included in the signal; and outputs strength information of the uplink signal or identification information or location information of the repeater.

The digital signal processing unit 520 includes a signal processing unit 522, a D/A converter 524, a signal detector 526, a signal strength information generator 527 and a transmitter 528.

The signal processing unit 522 amplifies a signal received from the digital receiver 510; multiplexes the signal received from the digital receiver 510 and transmits it to the D/A converter 524.

The D/A converter 524 converts a signal received from the signal processing unit 522 into an RF signal, and transmits the RF signal to the RF unit 530.

The signal detector 526 detects the identification information of the wireless communication terminal from the signals received from the digital receiver 510.

The signal strength information generator 527 generates strength information of an uplink signal outputted from the wireless communication terminal when the identification information of the wireless communication terminal detected by the signal detector 526 is identical with the identification information of the wireless communication terminal stored in a terminal information storage (not illustrated).

The transmitter 528 transmits the strength information of the uplink signal and location information and identification information of the remote repeater (not illustrated) to the location information server 270.

Hereinafter, there will be explained a rescue request signal processing method in accordance with the present invention and a location information providing method.

Figure 6A:
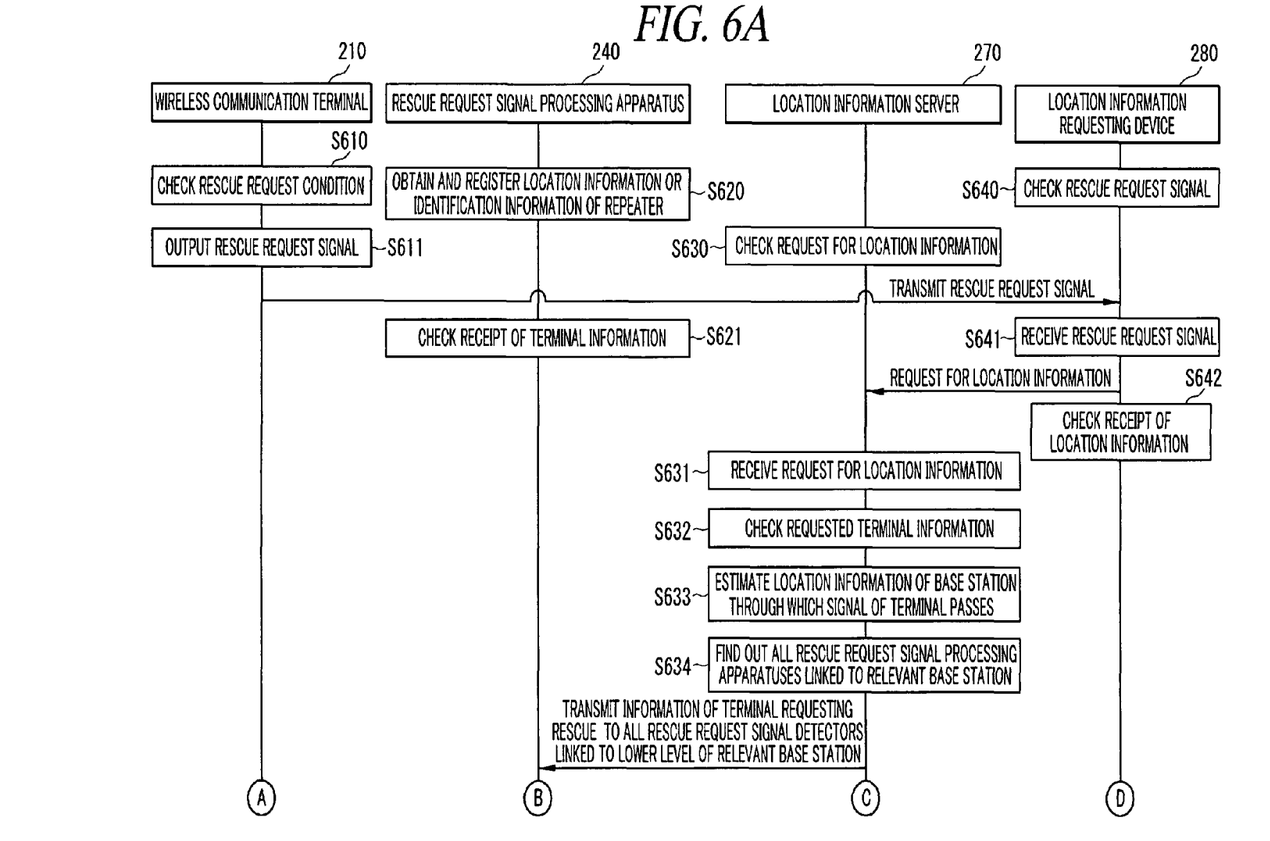
FIGS. 6A and 6B are flowcharts illustrating a location information providing method in accordance with an embodiment of the present invention.
Figure 6B:
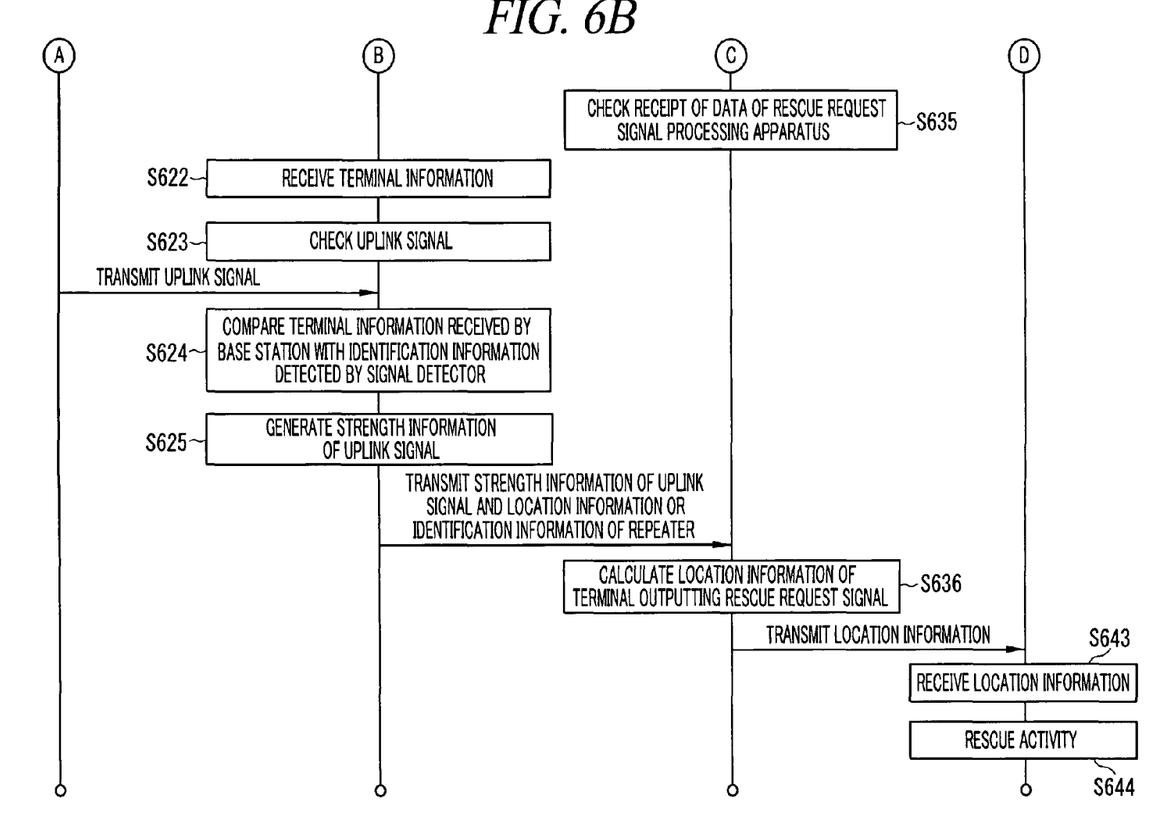

FIGS. 6A and 6B are flowcharts illustrating a location information providing method in accordance with an embodiment of the present invention.

The wireless communication terminal 210 checks whether rescue request conditions are satisfied or not (S610), and if satisfied, the wireless communication terminal 210 outputs the rescue request signal E911 (S611). In this case, the outputted rescue request signal E911 is different from a general signal in view of signal strength and set to be within a preset frame of a whole frame. The rescue request signal E911 includes identification information of the wireless communication terminal 210. Further, the rescue request signal is outputted continually for a preset time or is outputted repeatedly at a preset period. At this time, the rescue request signal E911 is transmitted to the location information requesting device 280 via the repeater 230 and the base station 250.

A rescue request signal processing apparatus 240 externally or internally connected with each repeater obtains and stores location information or identification information of the repeater (S620).

The location information requesting device 280 checks whether the rescue request signal E911 is received or not (S640), and if received (S641), the location information requesting device 280 requests location information of the wireless communication terminal 210 outputting the rescue request signal E911 from a location information server 270. At this time, the request for location information includes the identification information of the wireless communication terminal outputting the rescue request signal E911.

The location information server 270 constantly checks whether a request of the location information requesting device 280 for location information is made or not (S630). If the request for location information is received (S631), the location information server 270 checks the identification information of the wireless communication terminal 210 included in the request for location information (S632).

Subsequently, the location information server 270 estimates location information of a base station, through which a signal of a wireless communication terminal passes, based on the identification information of the wireless communication terminal 210 (S633). The location information of the base station is estimated by a triangulation method.

Further, the location information server 270 finds out the rescue request signal processing apparatus 240 linked to a lower level of the estimated base station (S634) and transmits the identification information of the wireless communication terminal outputting the rescue request signal E911 to each rescue request signal processing apparatus 240.

The rescue request signal processing apparatus 240 receives the identification information of the wireless communication terminal from the location information server 270 (S622).

Further, the rescue request signal processing apparatus 240 constantly checks uplink signals transmitted from the wireless communication terminal 210 (S623) and compares the identification information of the wireless communication terminal detected from the uplink signals with the identification information of the wireless communication terminal received from the location information server 270 (S624). Then, if they are identical with each other, the rescue request signal processing apparatus 240 generates strength information of the uplink signal (S625) and transmits the strength information of the uplink signal and information of the repeater to the location information server 270.

The location information server 270 calculates the location information of the wireless communication terminal 210 based on the strength information of the uplink signal received from the rescue request signal processing apparatus 240 and the location information or identification information of the repeater (S636). Since the repeater which transmits the uplink signal of the wireless communication terminal outputting the rescue request signal E911 can be one or more, a repeater having the greatest uplink signal strength is determined as a repeater closest to the wireless communication terminal 210 outputting the rescue request signal E911.

If the location information of the wireless communication terminal 210 calculated as described above is transmitted to the location information requesting device 280 (S643), a rescue activities are carried out based on the information (S644).

With this configuration, it is possible to check the location information of the wireless communication terminal before the rescue request signal outputted from the wireless communication terminal 210 is amplified by the repeater, so that more accurate location information can be obtained.

The embodiment of the present invention can be embodied in a storage medium including instruction codes executable by a computer such as a program module executed by the computer. Besides, the data structure in accordance with the embodiment of the present invention can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The system and method of the present invention has been explained in relation to a specific embodiment, but its components or a part or all of its operation can be embodied by using a computer system having general-purpose hardware architecture.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

What is claimed is:

1. A rescue request signal processing device connected with an RF coupler and a repeater, the device comprising:
    a signal detector configured to detect a rescue request signal from an uplink signal outputted from a wireless communication terminal and identification information of the wireless communication terminal from the rescue request signal;
    a signal strength information generator configured to:
    compare the detected identification information of the wireless communication terminal with identification information included in a request signal for location information transmitted from a location information server,
    and generate strength information of the uplink signal of the wireless communication terminal when the detected identification information of the wireless communication terminal is identical with the identification information included in the request signal; and
    a transmitter configured to transmit the strength information of the uplink signal and at least one of location information and identification information of the repeater to the location information server,
    wherein the identification information included in the request signal is obtained by the location information server from a location information requesting device connected to a base station that serves the wireless communication terminal,
    wherein the signal detector receives a signal which has not yet been amplified by the repeater from the RF coupler so as to detect the rescue request signal from the signal serving as the uplink signal, and
    wherein the uplink signal is transmitted via a preset channel from the wireless communication terminal to the RF coupler and comprises the rescue request signal set within a preset frame of a whole frame of the uplink signal, and the rescue request signal is sent from the wireless communication terminal when a pre-determined rescue request condition is satisfied.

2. The rescue request signal processing device of claim 1, further comprising:
    a mixer configured to convert a frequency of a signal outputted from the wireless communication terminal into a frequency that is digitally convertible;
    a channel filter configured to filter the signals having the frequencies converted by the mixer to obtain a signal corresponding to a predetermined channel;
    a terminal information storage configured to store the identification information of the wireless communication terminal included in the request signal for location information; and
    a repeater information storage configured to store the location information or identification information of the repeater.

3. The rescue request signal processing device of claim 1, wherein if the repeater includes a SMS (short message service) terminal, the transmitter is linked to an internal network operation system of the repeater so as to transmit the strength information of the uplink signal and at least one of the location information and the identification information of the repeater to the location information server.

4. A rescue request signal processing method using a rescue request signal processing device connected with a RF coupler and a repeater, the method comprising:
    detecting a rescue request signal from an uplink signal outputted from a wireless communication terminal and identification information of the wireless communication terminal from the rescue request signal;
    comparing the detected identification information of the wireless communication terminal with identification information included in a request signal for location information of transmitted from a location information server;
    generating strength information of the uplink signal of the wireless communication terminal when the detected identification information of the wireless communication terminal is identical with the identification information included in the request signal; and
    transmitting the generated strength information of the uplink signal and location and identification information of the repeater to the location information server,
    wherein the identification information included in the request signal is obtained by the location information server from a location information requesting device connected to a base station that serves the wireless communication terminal,
    wherein the detecting the rescue request signal receives a signal which has not yet been amplified by the repeater from the RF coupler so as to detect the rescue request signal from the signal serving as the uplink signal, and
    wherein the uplink signal is transmitted via a preset channel from the wireless communication terminal to the RF coupler and comprises the rescue request signal set within a preset frame of a whole frame of the uplink signal, and the rescue request signal is sent from the wireless communication terminal when a pre-determined rescue request condition is satisfied.

* * * * *